United States Patent
Smith

(10) Patent No.: US 11,008,935 B2
(45) Date of Patent: May 18, 2021

(54) GROOVE TRAP APPARATUS FOR COMBUSTION AND COMPRESSION MACHINERY

(71) Applicant: Justin Smith, Prescott, AZ (US)

(72) Inventor: Justin Smith, Prescott, AZ (US)

(*) Notice: Subject to any disclaimer, the term of this patent is extended or adjusted under 35 U.S.C. 154(b) by 0 days.

(21) Appl. No.: 16/363,960

(22) Filed: Mar. 25, 2019

(65) Prior Publication Data
US 2019/0292980 A1   Sep. 26, 2019

Related U.S. Application Data

(60) Provisional application No. 62/647,349, filed on Mar. 23, 2018.

(51) Int. Cl.

| | |
|---|---|
| *F02B 55/14* | (2006.01) |
| *F01C 21/08* | (2006.01) |
| *F01C 21/10* | (2006.01) |
| *F01C 21/00* | (2006.01) |

(52) U.S. Cl.
CPC .............. *F02B 55/14* (2013.01); *F01C 21/08* (2013.01); *F01C 21/10* (2013.01); *F01C 2021/1625* (2013.01)

(58) Field of Classification Search
CPC .. F01C 1/00; F01C 21/08; F01C 21/10; F01C 21/102; F01C 21/104; F01C 2021/125; F01C 2021/1625; F01C 2021/1637; F02B 55/14
See application file for complete search history.

(56) References Cited

U.S. PATENT DOCUMENTS

| | | | | |
|---|---|---|---|---|
| 5,251,595 A | * | 10/1993 | Wei-Min ................ | F02B 53/02 |
| | | | | 123/223 |
| 6,347,611 B1 | * | 2/2002 | Wright .................. | F01C 1/3566 |
| | | | | 123/223 |

FOREIGN PATENT DOCUMENTS

| | | | | |
|---|---|---|---|---|
| GB | 1531541 A | * | 11/1978 | ............. F01C 21/08 |
| WO | WO-9716635 A1 | * | 5/1997 | ............ F01C 1/3566 |

* cited by examiner

*Primary Examiner* — Audrey K Bradley
(74) *Attorney, Agent, or Firm* — Michael L. Greenberg, Esq.; Greenberg & Lieberman, LLC

(57) ABSTRACT

A combustion system and apparatus is disclosed. The apparatus employs a groove-shaped combustion area and a trap composed of a lid and a door. The lid is disposed in communication with the trap and is configured to slide within and over the groove-shaped combustion area during use. Combustion occurs within the groove-shaped combustion area, pushing the trap, whereby a rotor is forced to rotate, conveying power from a combustible material to perform work. As a corollary, the apparatus may be configured for use in the field of air compression and air decompression. Multiple groove-shaped combustion areas may be configured in a parallel or series orientation. Gas compression/decompression only utilizes a single groove, whereas combustion preferably utilizes a compression groove and a combustion groove.

11 Claims, 9 Drawing Sheets

GROOVE TRAP APPARATUS FOR COMBUSTION AND COMPRESSION MACHINERY

CONTINUITY

This application is a non-provisional patent application of provisional patent application No. 62/647,349, filed on Mar. 23, 2018, and priority is claimed thereto.

FIELD OF THE PRESENT INVENTION

The present invention relates to combustion and/or compression machinery, and more specifically relates to a sliding groove and trap apparatus configured to facilitate a simplified compression and/or combustion system varying in compression chamber design, application, and implementation from that of conventional compression chambers.

BACKGROUND OF THE PRESENT INVENTION

Combustion engines have a wide range of applications which call for a diverse variety of sizes of combustion chambers. However, most combustion chambers are configured to capture energy from the motion of the piston in a single motion, and are conventionally cylindrical in shape. If there were a way to effectively capture the energy of the motion of a sliding combustion area, energy production and capture could be maximized. As such, more work could be performed while expending less fuel.

Thus, there is a need for a new form of combustion/compression chamber apparatus. Such an apparatus preferably employs a grooved area as a combustion area, and uses a sliding trap mechanism to facilitate compression. In such an apparatus, the sliding motion of the trap mechanism is propelled via the combustion and inherent pressurization itself.

SUMMARY OF THE PRESENT INVENTION

This Summary of the Invention is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is a groove trap combustion and compression apparatus configured for use within engines, compressors, and similar energy conversion/generation mechanisms. The present invention is equipped with a groove-shaped combustion area and a sliding trap mechanism disposed atop the groove-shaped combustion area. The trap is equipped with a lid portion and a trap portion. The lid portion may be disposed in permanent communication with the trap portion, as both components slide preferably together during normal operation of certain embodiments of the present invention. The combination of the trap portion and the lid portion allow for the insertion of (or pivoting thereof) the trap into the groove-shaped combustion area while maintaining a consistent seal.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
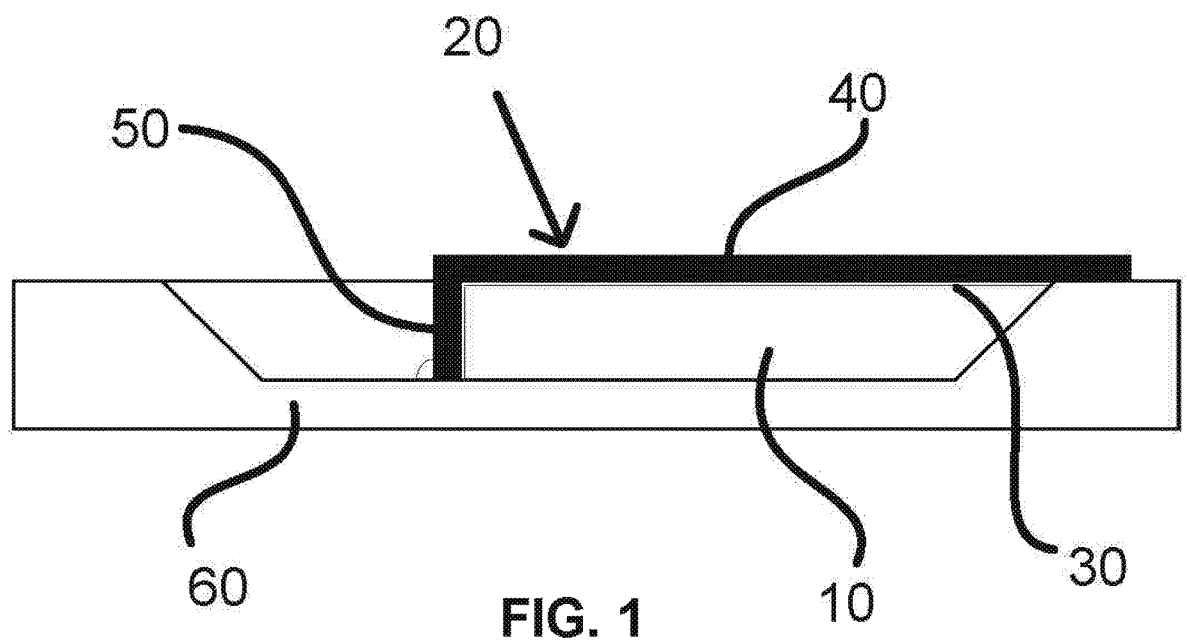
FIG. 1 depicts a cutaway view of the apparatus of the present invention as seen from the side.

The present invention is a combustion apparatus consisting of a groove-shaped combustion area (10), a groove-shaped compression area (15), and a trap (20) disposed atop the groove-shaped combustion area (10) and groove-shaped compression area (15). The groove-shaped combustion area (10), as shown in FIG. 1, amounts to a groove-shaped, sealable chamber. As such, the groove-shaped combustion/compression area (10) is equipped with at least one seal (30) to ensure compression can occur within the groove-shaped combustion area (10). The at least one seal (30) is preferably of a high temperature material with a low coefficient of friction to facilitate sliding of the trap (20). It is envisioned that the at least one seal (30) of the present invention is a conventional seal sized to fit the appropriate embodiment of the present invention. The groove-shaped combustion area (10) and groove-shaped compression area (15) are preferably disposed within a base (60) which is preferably composed of a durable metallic alloy. The base (60) may be of a variety of shapes and/or sizes, including, but not limited to a disk plane, a cylinder, a rectangular plane, or any other form of shaped metal.

Figure 4:
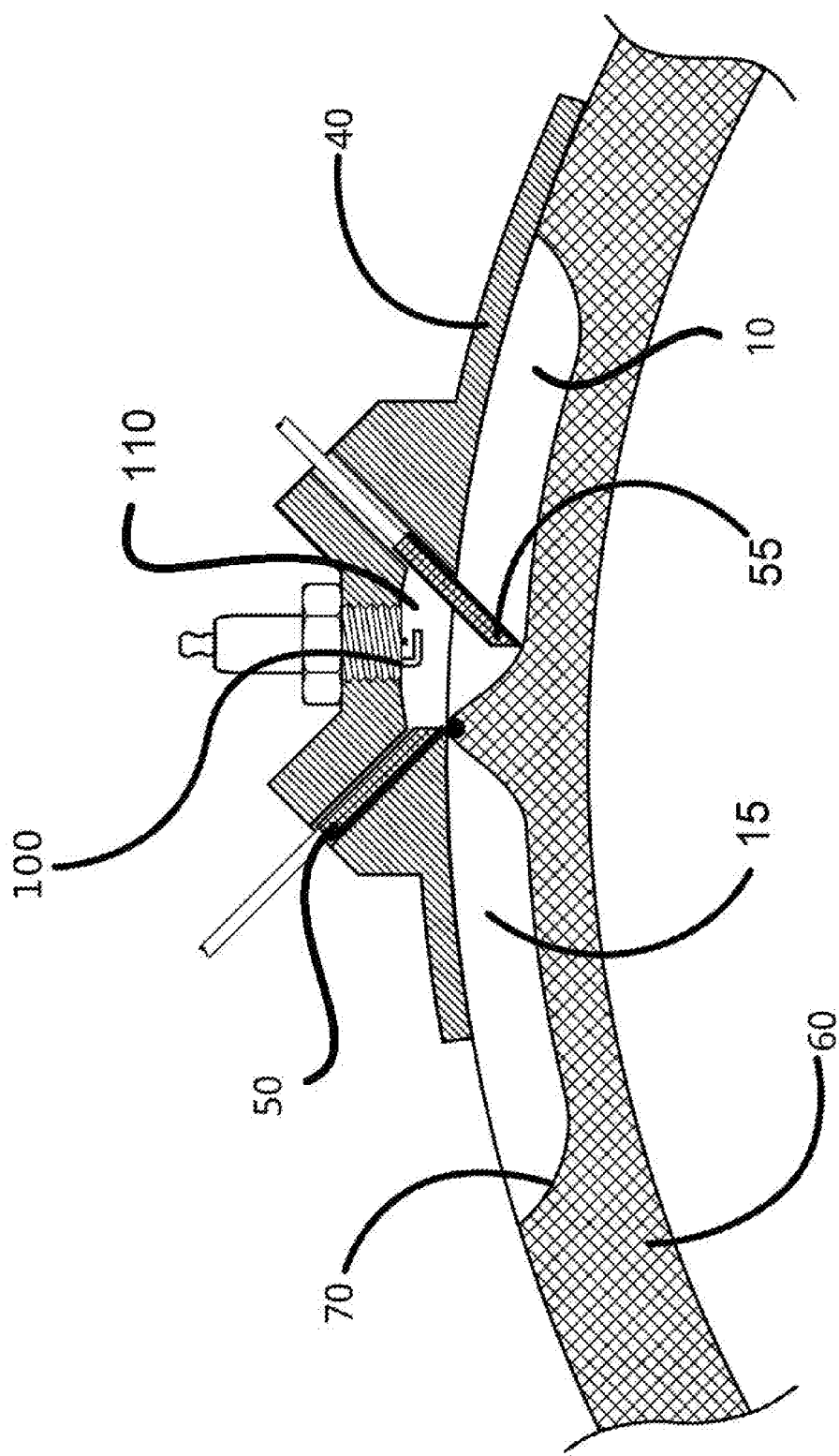
FIG. 4 shows a cutaway view of a primary embodiment of the present invention, shown in the second phase of operation.
Figure 5:
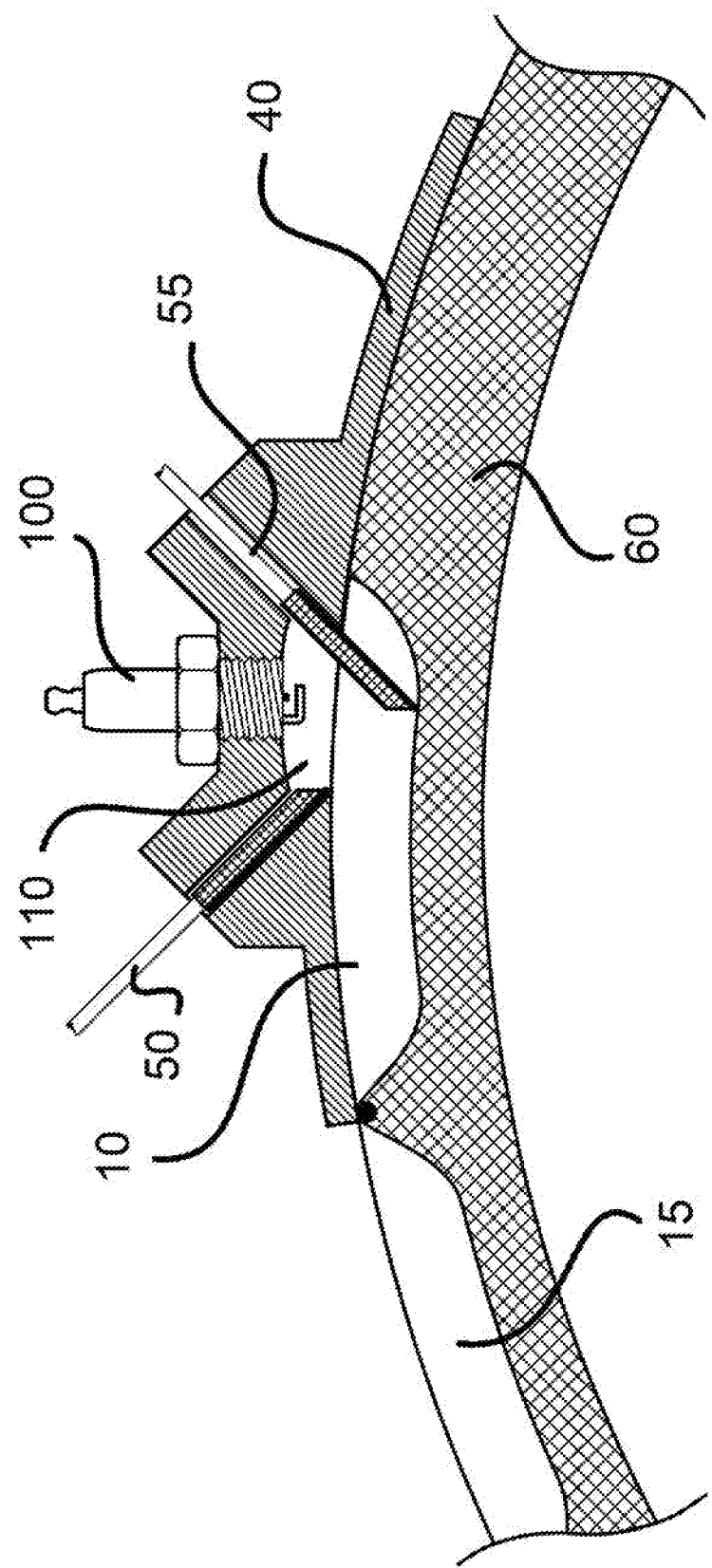
FIG. 5 shows a cutaway view of a primary embodiment of the present invention, shown in the third phase of operation.
Figure 6:
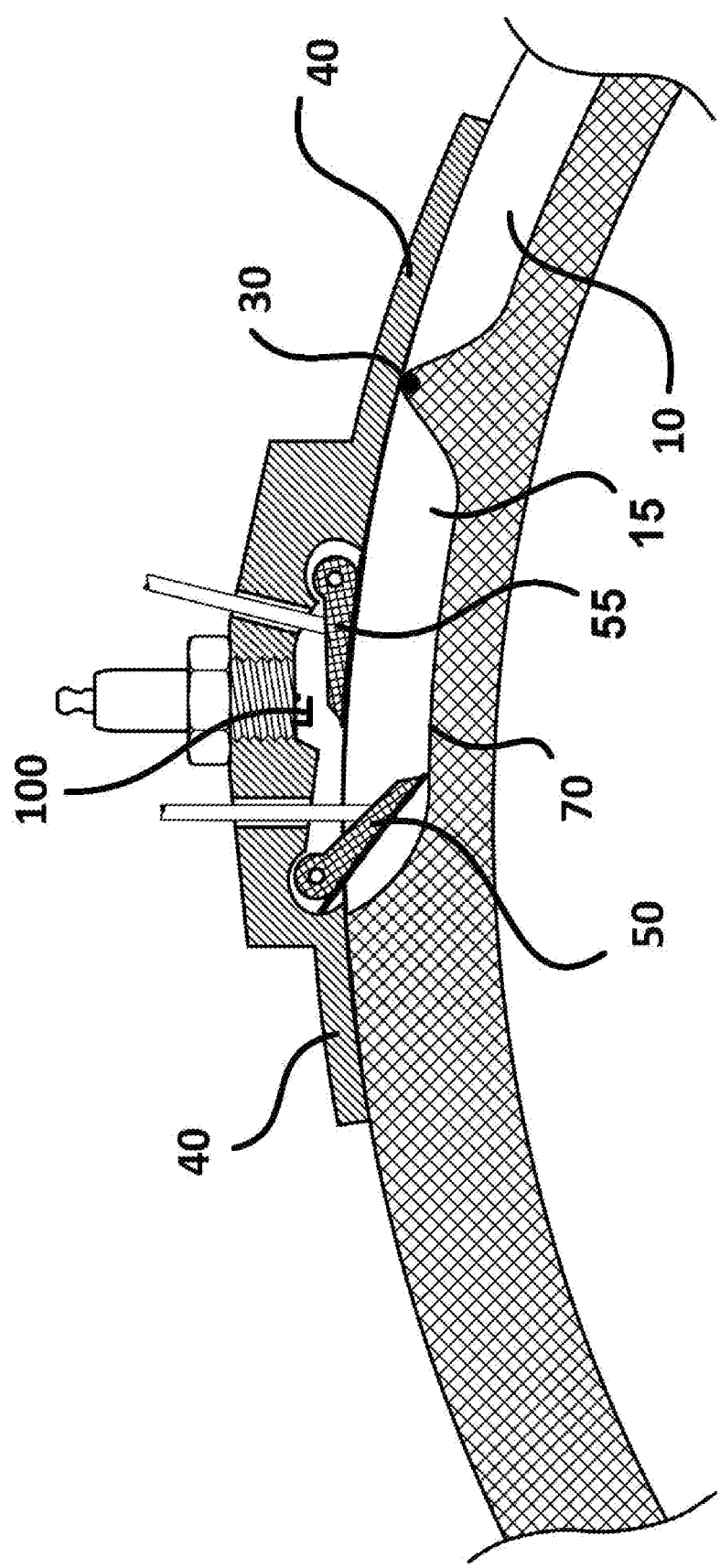
FIG. 6 depicts a cutaway view of a second primary embodiment of the present invention, shown in the first phase of operation.
Figure 7:
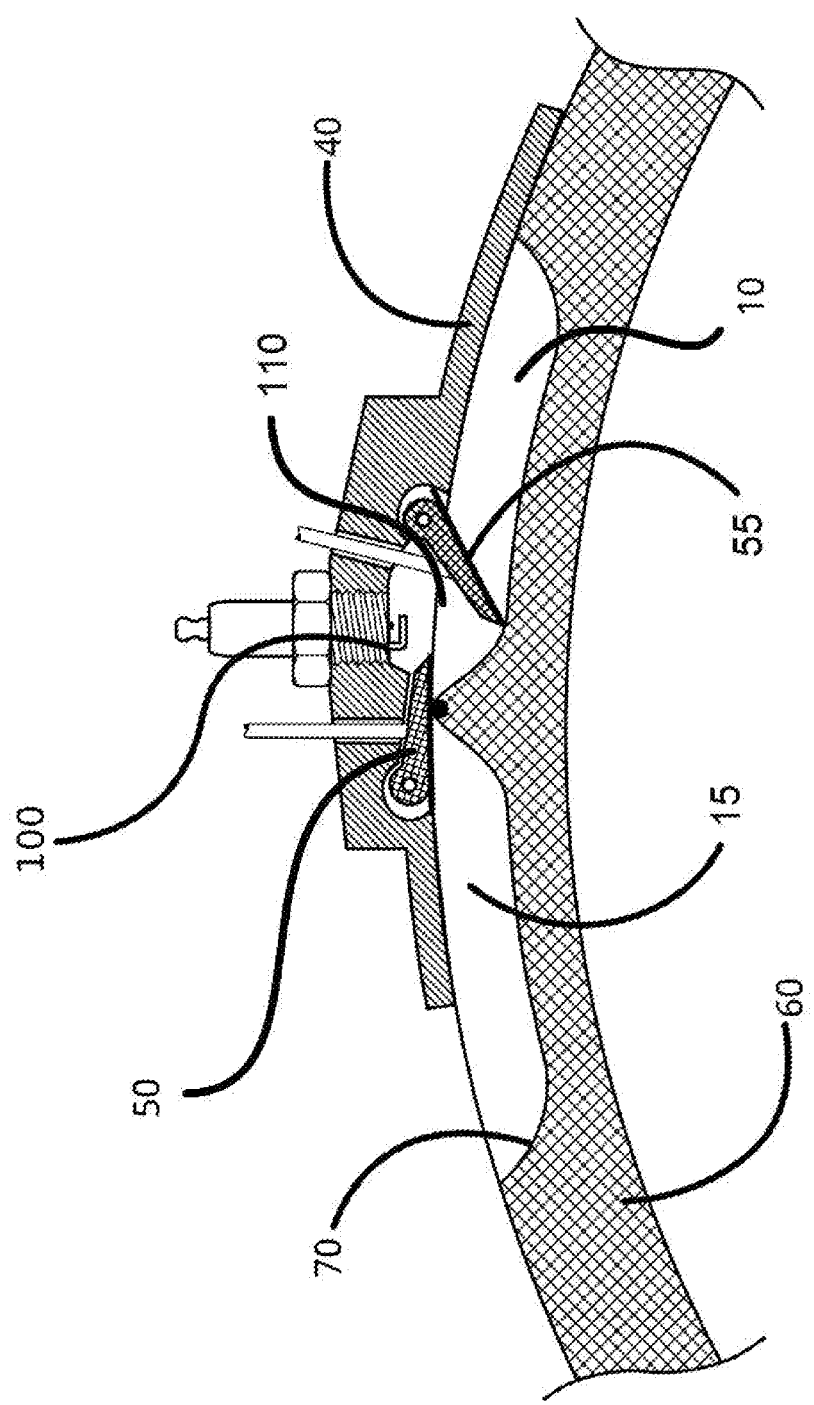
FIG. 7 exhibits a cutaway view of a second primary embodiment of the present invention, shown in the second phase of operation.
Figure 8:
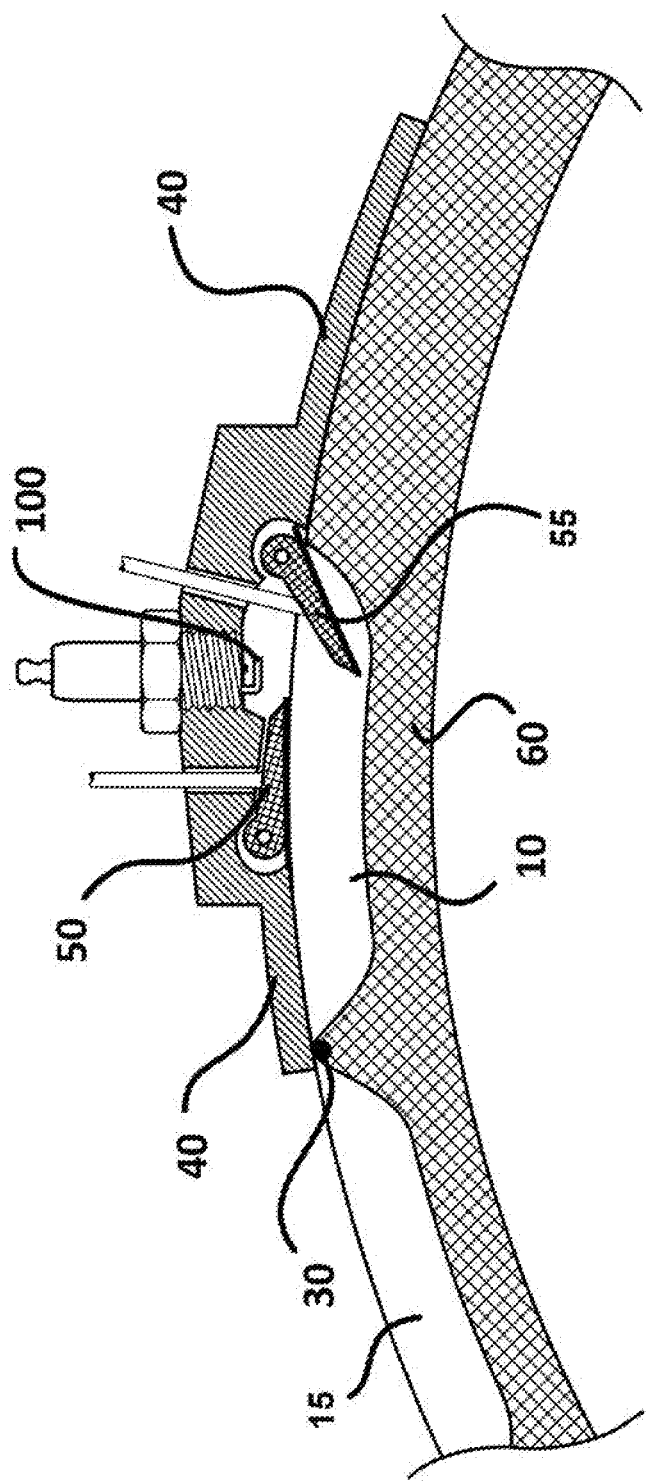
FIG. 8 exhibits a cutaway view of a second primary embodiment of the present invention, shown in the third phase of operation.

The trap (20) includes a lid portion (40), a trap portion, a compression door (50) or combustion door (55). The lid portion (40) is in communication with the compression door (50) and combustion door (55) of the present invention. A spark plug (100) or similar ignition device is preferably present adjacent to the door(s) (50), within a combustion chamber (110) of the present invention as depicted in FIG. 4. The spark plug (100) provides the catalyst for combustion which takes place within the groove-shaped combustion area (10). Upon ignition of a cycle of the present invention, the groove-shaped combustion area (10) is filled with a combustible fuel, the spark plug (100) fires, and combustion occurs causing a build-up of pressure against combustion door (55) forcing rotation (or movement) of the base (60) as the lid portion (40) glides against the base (60) of the apparatus. As movement occurs, the combustion door (55) is forced to recede due to a slope in the inherent shape of the groove-shaped combustion area (10), the compression door (50) extends, and exhaust is vented from the groove-shaped combustion area (10).

Figure 2:
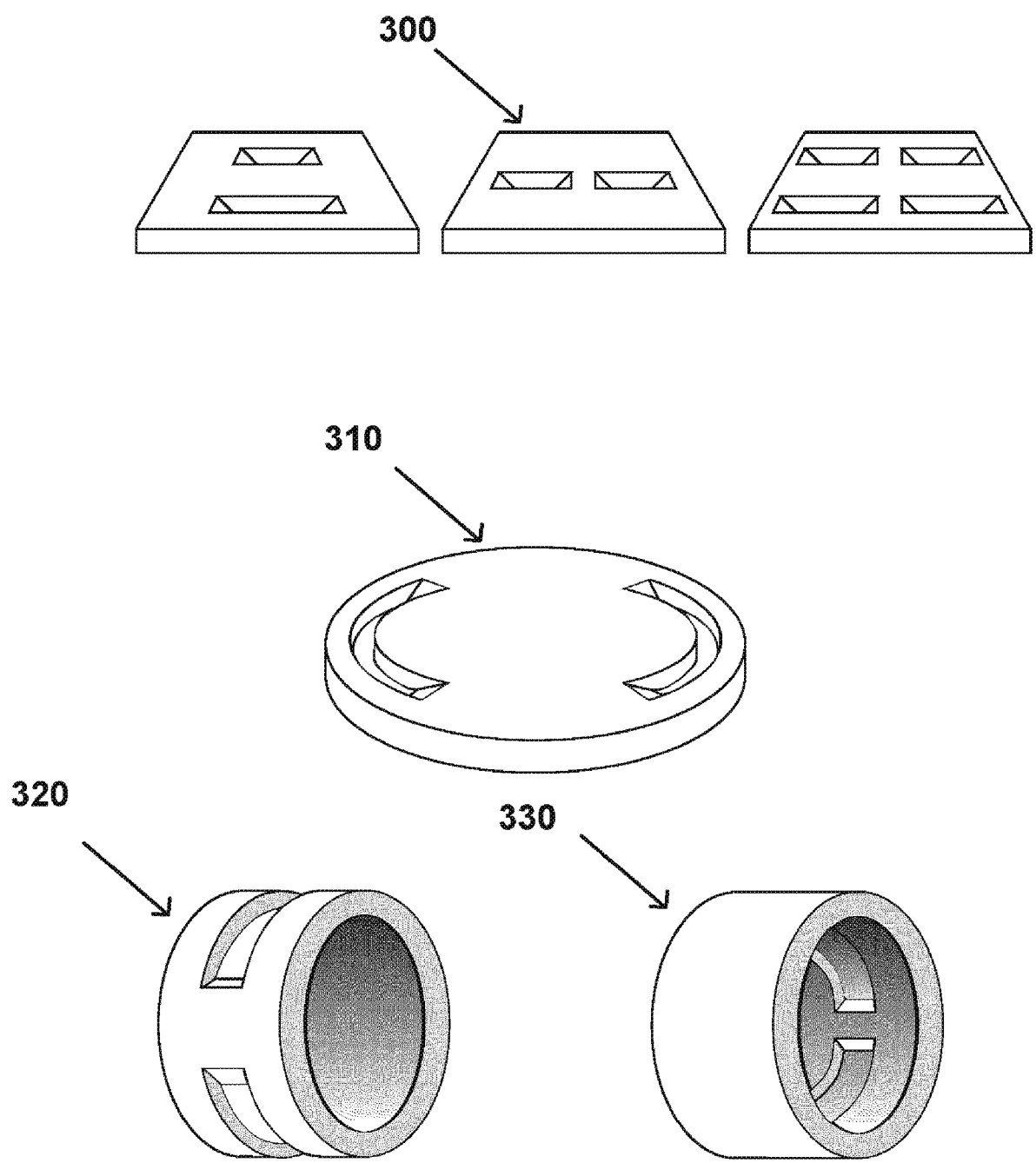
FIG. 2 exhibits alternate embodiments of the present invention, detailing implementation of the apparatus in a variety of differently shaped bases of the present invention, including a cylindrical base, a disc plane base, and a multi-groove square base.
Figure 3:
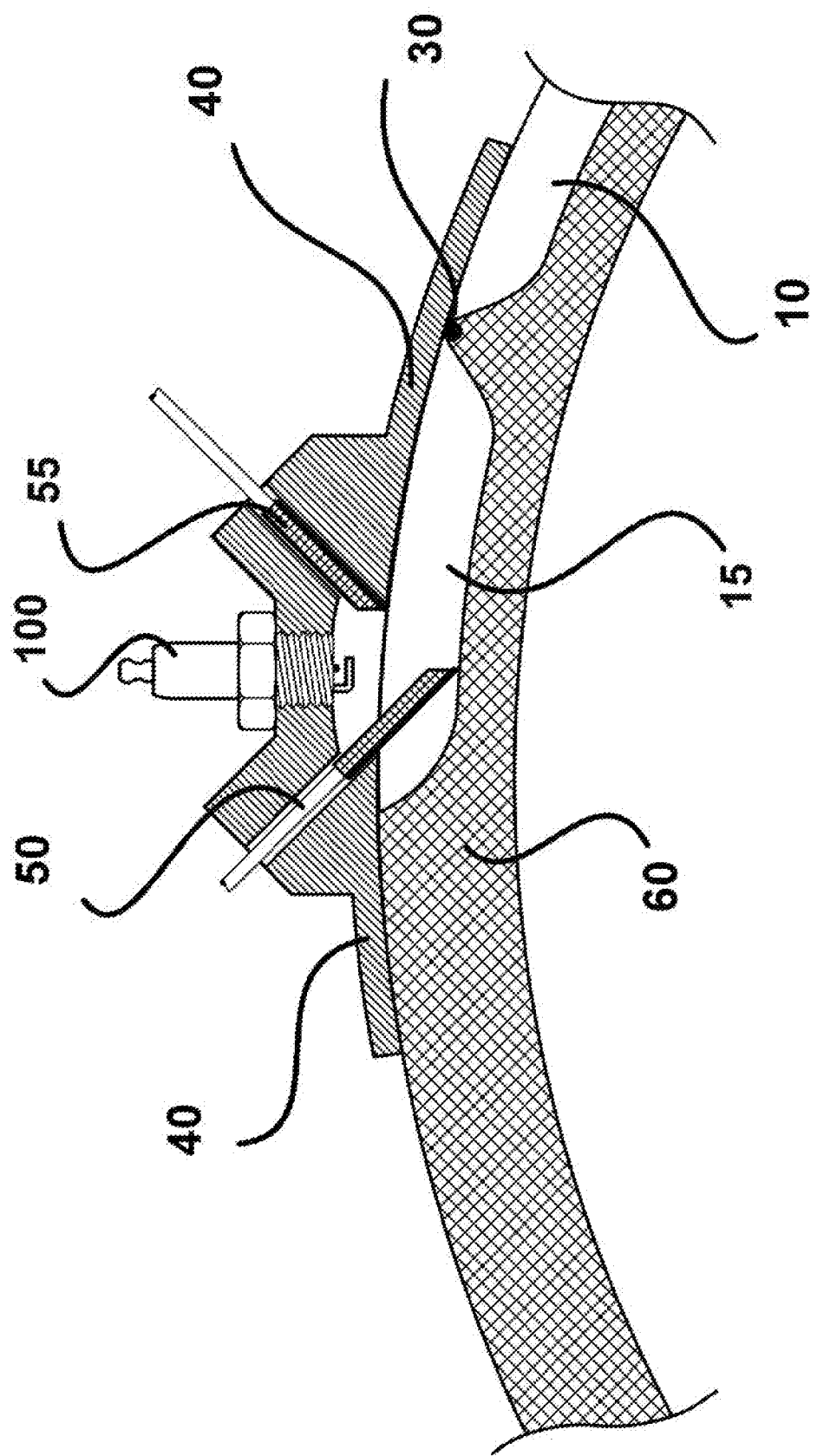
FIG. 3 depicts a cutaway view of a primary embodiment of the present invention, shown in the first phase of operation.

As depicted in FIG. 2, it should be understood that the present invention is preferably present in multiple iterations. As such, in installations employing the apparatus of the present invention, multiple groove-shaped combustion/compression areas (10, 15) and traps (20) are preferably disposed adjacent to one another, similar to that of a conventional multi-cylinder engine or compression apparatus. It should be understood that multiple iterations of the apparatus of the present invention require calibration for timing as to when each iteration fires. Such calibration is preferably mainly conducted via spacing between the iterations of the apparatus and system of the present invention. Embodiments of the present invention preferably do not fire simultaneously, but are offset such that vibration and excess noise is minimized.

It should be understood that the system and apparatus of the present invention is configured for use within gas compression systems, gas decompression systems, and/or combustion motors. The combustible medium may be one of any conventional medium, including gasoline, kerosene, diesel, etc.

In preferred embodiments of the present invention, it should be noted that the engine employing the system of the present invention is preferably designed for operation in a unitary direction, such as an airplane propeller, helicopter rotor(s), or the like.

It should be noted that an exhaust manifold is preferably disposed on the left of the lid portion (40), and a conventional carburetor is preferably disposed on the right side of the lid portion (40). The carburetor and exhaust manifold are fixed in position, and therefore do not rotate. Only the rotor of the present invention rotates, and the doors oscillate or flap respectively (depending on the embodiment employed). It should be understood that the rotor includes the base (60), which is configured to rotate per combustion occurring within the groove-shaped combustion area (10) of the base (60).

Figure 9:
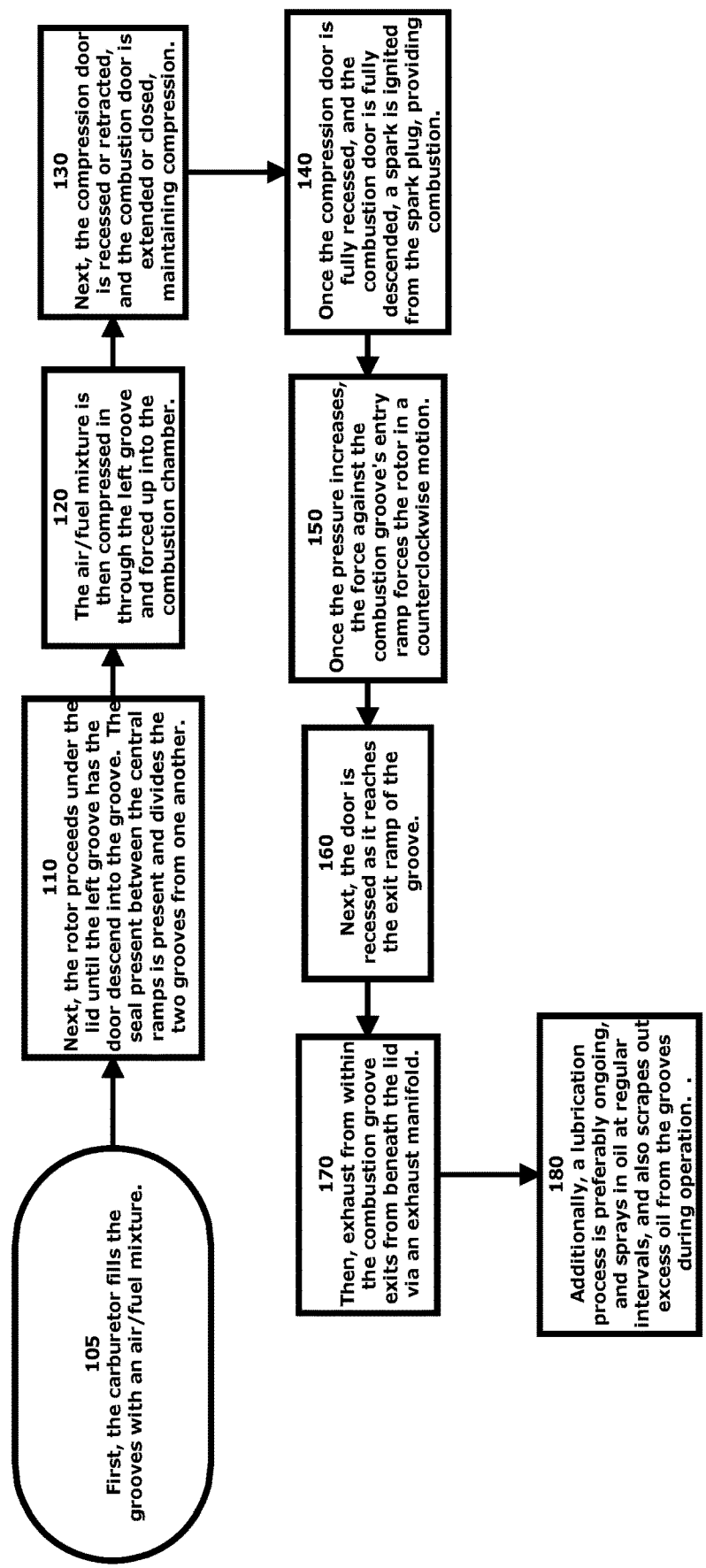
FIG. 9 shows a flow chart detailing the process of operation and use of the apparatus of the present invention.

The process of use of the present invention, as depicted in FIG. 9, is preferably as follows:

1. First, the carburetor fills the grooves with an air/fuel mixture. (105)
2. Next, the rotor proceeds under the lid until the left groove has the door descend into the groove. The seal present between the central ramps is present and divides the two grooves from one another. (110)
3. The air/fuel mixture is then compressed in through the left groove and forced up into the combustion chamber. (120) It should be noted that the far left ramp is under compression, and the farther right exit ramp for combustion, neither of which are firmly sealed against the lid, providing for air flow.
4. Next, the compression door is recessed or retracted, and the combustion door is extended or closed, maintaining compression. (130)
5. Once the compression door is fully recessed, and the combustion door is fully descended, a spark is ignited from the spark plug, providing combustion. (140)
6. Once the pressure increases, the force against the combustion groove's entry ramp forces the rotor in a counterclockwise motion. (150) It should be noted that the pressure build-up behind the combustion door is not managed in this example.
7. Next, the door is recessed as it reaches the exit ramp of the groove. (160)
8. Then, exhaust from within the combustion groove exits from beneath the lid via an exhaust manifold. (170) The exhaust manifold is preferably disposed on the left side, and a scraper door is used if needed.
9. Additionally, a lubrication process is preferably ongoing, and sprays in oil at regular intervals, and also scrapes out excess oil from the grooves during operation. (180)

It should be understood that some embodiments of the present invention preferably include a combustion groove (10) and a compression groove (15), which are separate, yet integrated into the same base (60). The compression door (50) and combustion door (55) are preferably in communication with, or embedded within, the lid portion (40) of the present invention, as depicted in the figures showing the preferred embodiments of the present invention. The combustion door (55) is preferably present within the groove-shaped combustion area (10), and the compression door (50) is present within the groove-shaped compression area (15).

Additionally, it should be noted that, in the preferred embodiment of the present invention, the trap portions (20) amount to doors (50) which are preferably cam-driven. The cams are not depicted in the figures; however, it is envisioned that conventional cams are employed to facilitate movement of the trap portions (20). It should be understood that the base (60) of the present invention amounts to a rotor which is preferably disposed in communication with at least one gear configured to perform work.

As depicted in FIG. 2, alternate forms of the present invention may be available. Such alternate forms preferably include a planar embodiment (300), a disc embodiment (310), an external cylinder embodiment (320), and an internal cylinder embodiment (330). Each of these may be equipped with multiple iterations of the groove-shaped combustion/compression area (10) of the present invention.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A combustion-harnessing mechanism comprising:
a body, said body equipped with a base;
a groove-shaped combustion area, said groove-shaped combustion area disposed within and along a circumference of said base;
a groove-shaped compression area, said groove-shaped compression area disposed within and along the circumference of said base;
a lid portion, said lid portion disposed atop said groove-shaped combustion area and said groove-shaped compression area;
wherein said lid portion is configured to move above said groove-shaped combustion area and said groove-shaped compression area sequentially;
a trap, said trap disposed within said groove-shaped combustion area and said groove-shaped compression area, in communication with said lid portion;
an ignition device, said ignition device disposed in communication with said lid portion, above said groove-shaped combustion area and said groove-shaped compression area;
wherein said lid portion is in communication with said body; and
wherein said base is configured to rotate independently of said lid portion upon combustion and compression within said groove-shaped combustion area and said groove-shaped compression area.

2. The apparatus of claim 1, wherein said trap is a door.

3. The apparatus of claim 1, wherein said base is configured to rotate unidirectionally.

4. The apparatus of claim 1, wherein said base does not oscillate.

5. The apparatus of claim 1, wherein said base is a rotor.

6. The apparatus of claim 1, wherein said body is cylindrical.

7. The apparatus of claim 6, wherein said base, said groove-shaped combustion area, said groove-shaped compression area, and said trap are composed of a durable metal suitable to withstand pressure of combustion.

8. A combustion/compression apparatus comprising:
a body, said body equipped with a base;
a groove-shaped combustion area, said groove-shaped combustion area disposed within said base;
a groove-shaped compression area, said groove-shaped compression area disposed within said base;
wherein said groove-shaped combustion area and said groove-shaped compression area are disposed inline within and along a circumference of said base;
a lid portion, said lid portion disposed atop said groove-shaped combustion area and said groove-shaped compression area;
at least one trap, said at least one trap disposed within said groove-shaped combustion area and said groove-shaped compression area, in communication with said lid portion;
an ignition device, said ignition device disposed in communication with said lid portion;
wherein said lid portion is in communication with said body;
wherein said base is configured to rotate independently of said lid portion upon combustion and compression within said groove-shaped combustion area and said groove-shaped compression area;
wherein said at least one trap is configured to retract upon movement against a slope of said groove-shaped combustion area and said groove-shaped compression area when driven by combustion or compression;
wherein said body is cylindrical; and
wherein said base is a rotor.

9. The apparatus of claim 8, wherein said base is configured to rotate unidirectionally.

10. The apparatus of claim 8, wherein said body divides said groove-shaped combustion area from said groove-shaped compression area.

11. The apparatus of claim 8, wherein said body divides said groove-shaped combustion area from said groove-shaped compression area.

* * * * *